United States Patent [19]

Petrzelka et al.

[11] Patent Number: 5,253,947
[45] Date of Patent: Oct. 19, 1993

[54] CONNECTION BETWEEN A TUBULAR SHAFT MADE OF A FIBER COMPOSITE MATERIAL AND A METAL JOURNAL, AS WELL AS A METHOD OF PRODUCING SUCH A CONNECTION

[75] Inventors: Miloslav Petrzelka, Much-Kranuchel; Werner Hoffmann, Siegburg; Thomas Schafferus, Rheinberg, all of Fed. Rep. of Germany

[73] Assignee: GKN Automotive AG, Siegburg, Fed. Rep. of Germany

[21] Appl. No.: 780,764

[22] Filed: Oct. 22, 1991

[30] Foreign Application Priority Data

Oct. 23, 1990 [DE] Fed. Rep. of Germany ....... 4033593
Mar. 7, 1991 [DE] Fed. Rep. of Germany ....... 4107222

[51] Int. Cl.$^5$ .............................. F16C 3/00; F16B 4/00
[52] U.S. Cl. ..................... 403/274; 403/277; 403/285
[58] Field of Search ............... 403/277, 280, 285, 274, 403/291, 5; 464/181, 182, 183; 29/523, 517

[56] References Cited

U.S. PATENT DOCUMENTS

| 3,561,798 | 2/1971 | Redfern . |
| 3,576,336 | 4/1971 | Uhlig . |
| 3,828,823 | 8/1974 | Douglas . |
| 4,132,437 | 1/1979 | Green . |
| 4,622,732 | 11/1986 | Broderick . |
| 4,654,478 | 3/1987 | Ishihara et al. ............... 403/285 X |
| 4,663,819 | 5/1987 | Traylor ......................... 464/181 X |
| 4,705,421 | 11/1987 | Depping ........................... 403/5 X |
| 4,932,924 | 6/1990 | Lobel .................................. 464/181 |

FOREIGN PATENT DOCUMENTS

| 3725959 | 2/1989 | Fed. Rep. of Germany . |
| 81928 | 5/1982 | Japan ................................ 29/523 |
| 1-153808 | 6/1989 | Japan . |
| 910750 | 11/1962 | United Kingdom ............... 29/517 |
| 2074914 | 11/1981 | United Kingdom ............... 29/523 |
| 2207732 | 2/1989 | United Kingdom . |

Primary Examiner—Randolph A. Reese
Assistant Examiner—Anthony Knight
Attorney, Agent, or Firm—Harness, Dickey & Pierce

[57] ABSTRACT

The invention relates to a locking connection for transmitting torque in driveshafts and the like. An internally and/or externally positioned metallic connecting element having a hub journal is inserted into or slid onto a tubular shaft made of a fiber composite material. The wall of the hub journal is radially plastically deformed, its surface being made to establish a locking connection with a surface of the shaft.

18 Claims, 4 Drawing Sheets

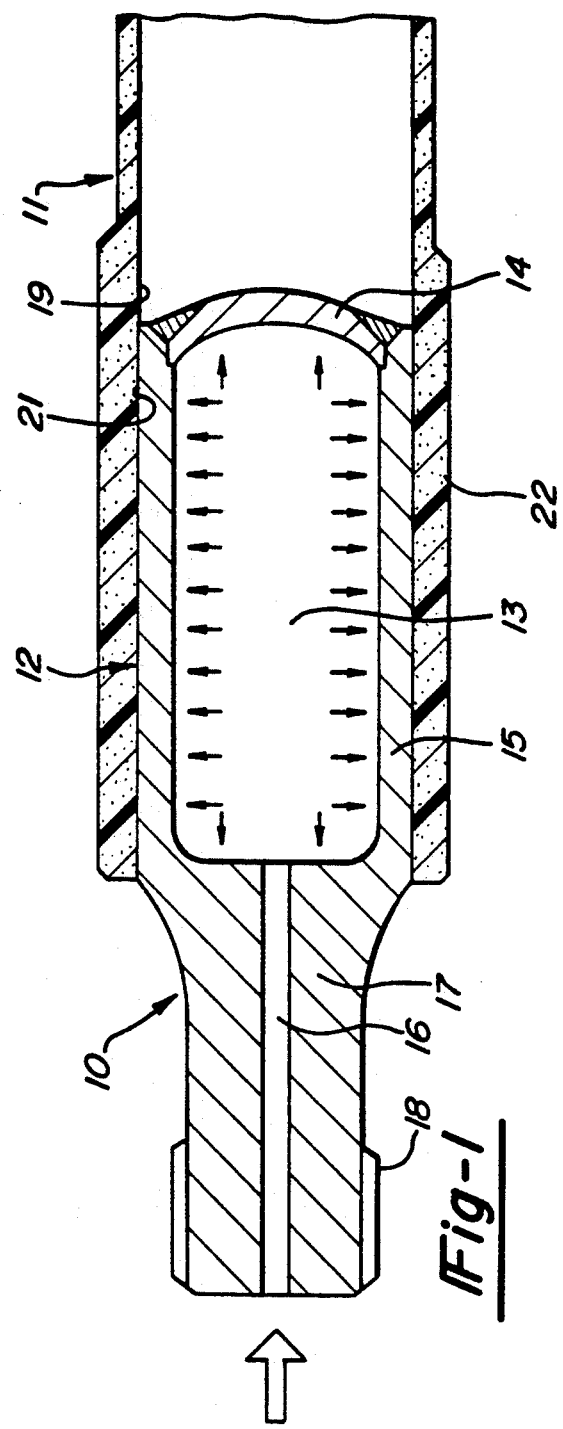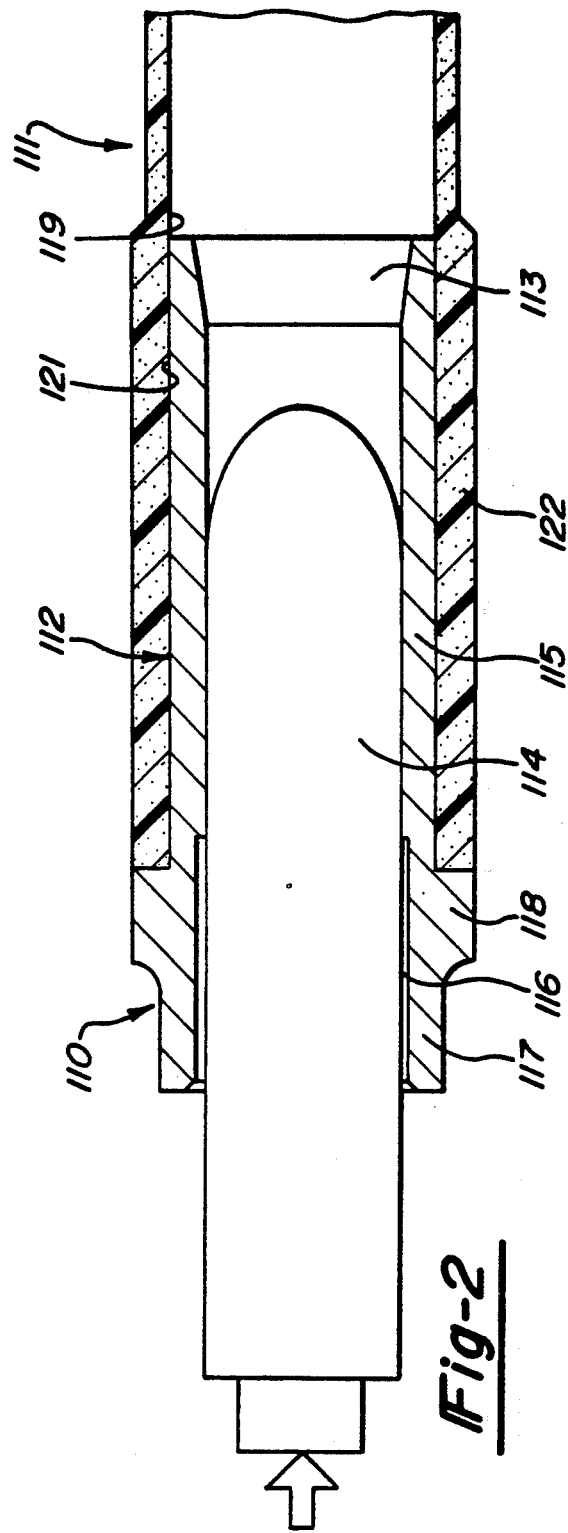

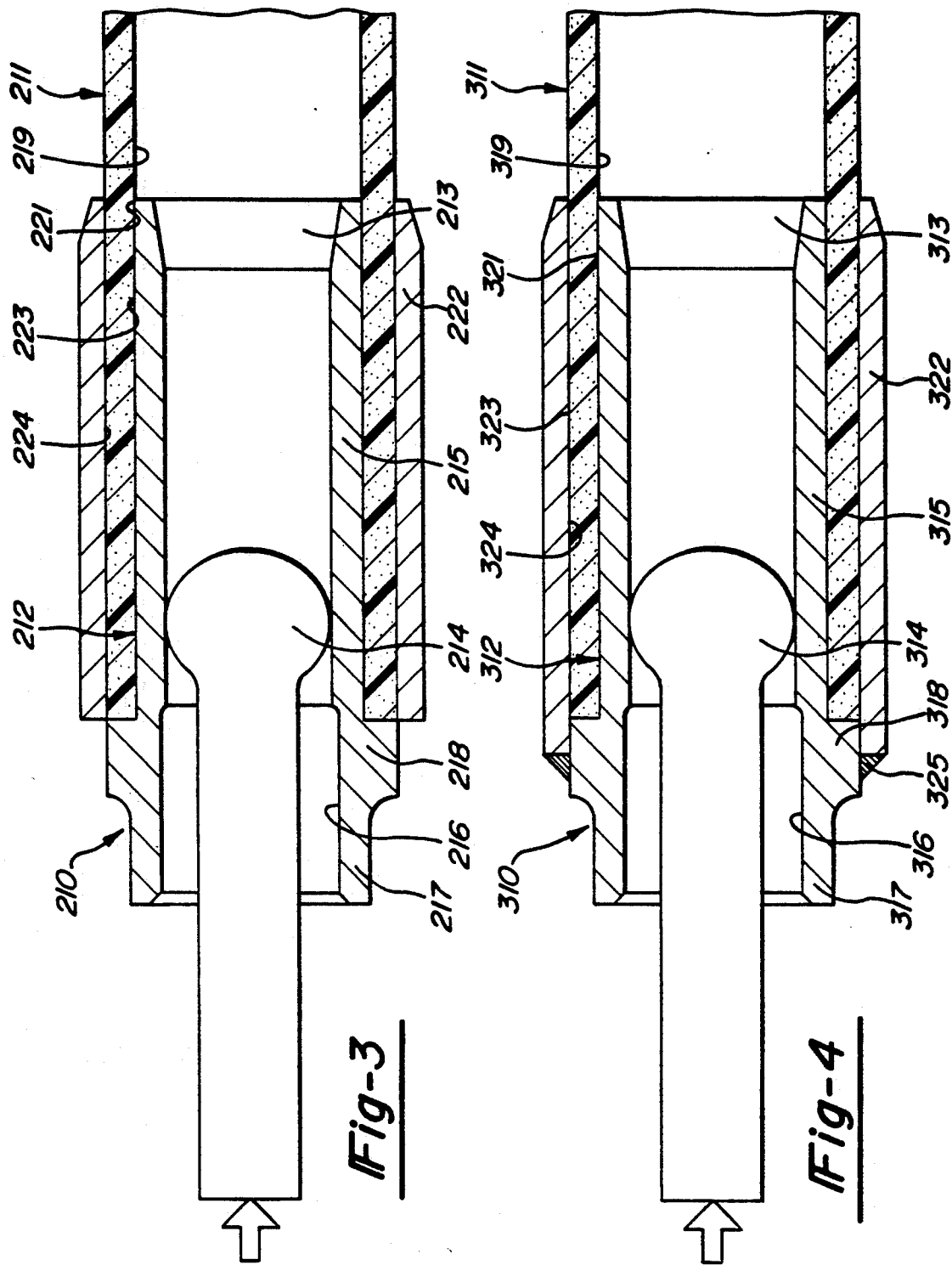

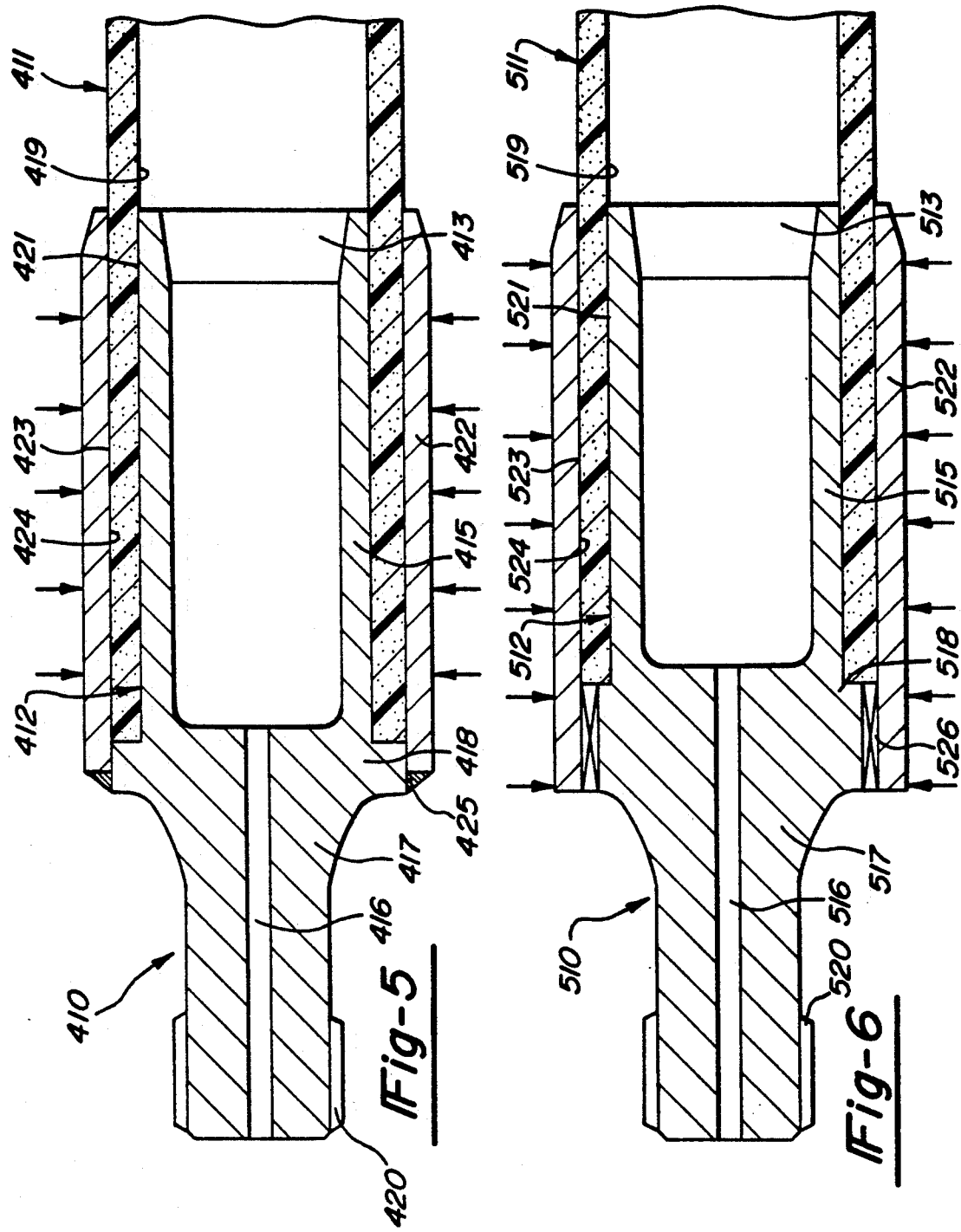

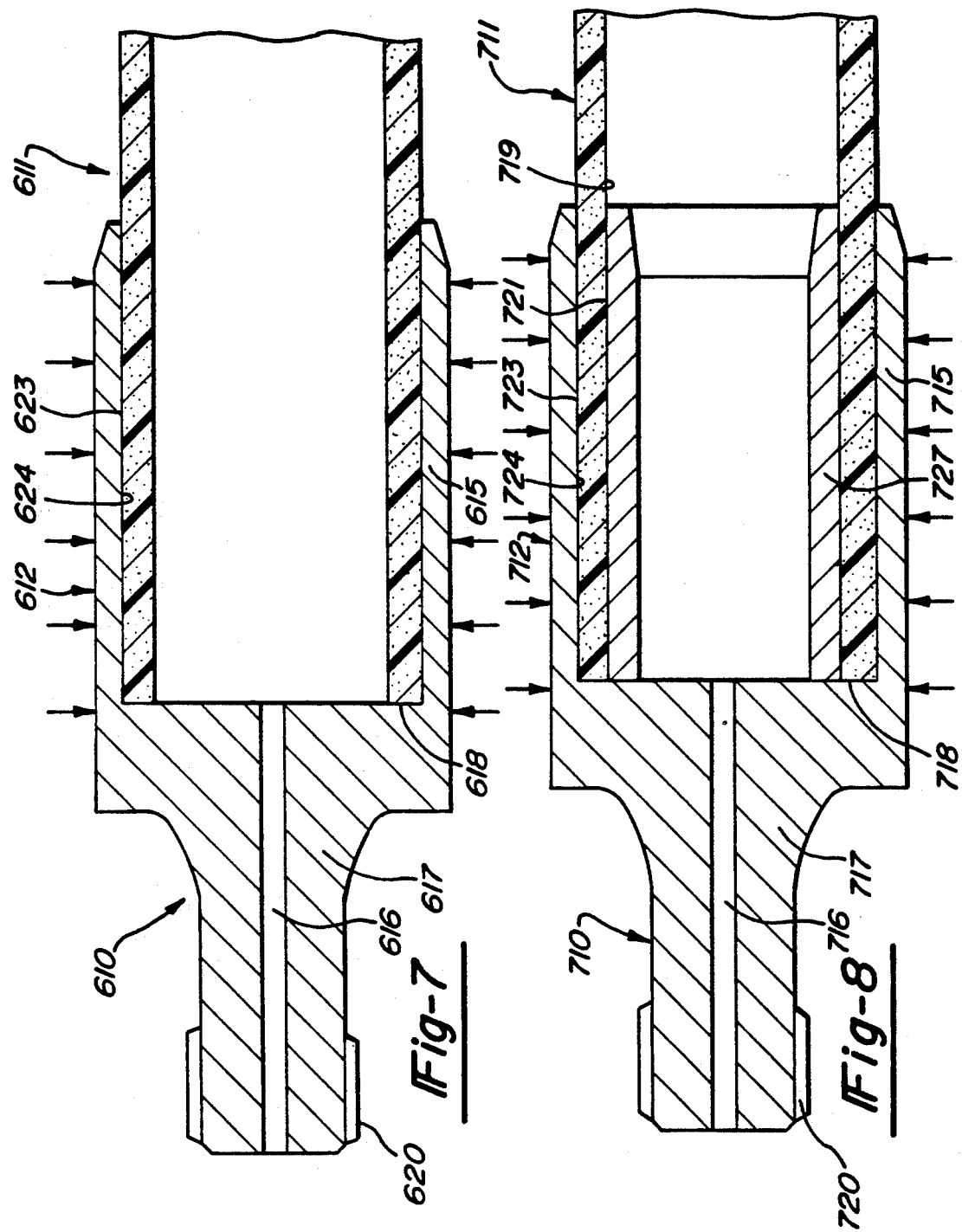

CONNECTION BETWEEN A TUBULAR SHAFT MADE OF A FIBER COMPOSITE MATERIAL AND A METAL JOURNAL, AS WELL AS A METHOD OF PRODUCING SUCH A CONNECTION

BACKGROUND AND SUMMARY OF THE INVENTION

The invention relates to a locking connection between a tubular shaft and a hub journal intended for transmitting torque in driveshafts and the like, and to a method for producing such a connection. The connection is especially suited for tubular shafts made of a fiber composite material and metallic connecting elements having a hub journal for positioning in or around the shaft end.

There are in the prior art press-connections, in which composite shafts are connected to a steel connecting journal to produce a joint. Such connections, e.g. as shown in DE 37 25 959 A1, serve to transmit torque in the drive lines of motor vehicles. The amount of torque to be transmitted depends on the radial compression or pretension in the connection between the steel journal or attachment and the plastic shaft. The required forces for the press-fit assembly increase with the need for higher radial compressive forces.

When using such shaft connections for side shafts, it is necessary to transmit torques which are up to three times higher than those required to be transmitted in the case of prior art cardan shifts. With the high press-fit forces required to assemble shafts for such applications, which forces may amount to approximately 15 to 20 tons, the composite shafts can be destroyed, either by inter-laminar shearing forces or by tube buckling occurring during the pressing-in operation. Furthermore, such shafts for press-fit connections require a high degree of precision be maintained during manufacture of the internal cross-section of the shaft and of the hub. A specific amount of excess dimension must be maintained in the surfaces which will make the connection in the press-fit.

It is an object of the invention to provide a shaft connection which permits high transmission forces and which can be produced by simple means.

According to a first embodiment, an objective is achieved by providing the hub journal in the form of a hollow journal which can be plastically expanded inside the shaft end, i.e. the hub journal is positioned in the shaft end and then expanded to produce an elastically expanded shaft end whose radial compression forms a connection with the hub journal.

With the help of this measure it is possible to provide a shaft connection in the case of which the connecting element can be manufactured without having to maintain exceedingly close tolerances. The hub journal outer diameter may initially be smaller than the inner diameter of the shaft to which the hub journal is to be connected. The two parts are made of different materials, the connecting element preferably being made of steel and the shaft of a fiber composite material, and they can easily be connected to each other. After having been inserted into the shaft, the hub journal is positioned by a collar or stop for example and hydraulically expanded to exceed the limit of elasticity. The shaft connection in accordance with the invention is capable of accommodating higher transmission forces than the locking connection achieved via a press-fit operation.

The connecting element may include a splined solid or hollow journal which is connected to the hub journal and which is used for sliding on the inner part of a rotary ball joint or a tripod joint. However, it is also possible to connect the outer part of such rotary ball joints or tripod joints or standard flange rings to the hub journal. In the case of the latter embodiment it is possible for the internal cross-section of the hub journal to be freely accessible from the outside.

For expansion of the hub journal against the surface of the shaft an expandable chamber can be provided within the hub journal. In order to obtain a pressurizable inner space in the hub journal the chamber should be accessible from the outside via a bore and enclosed by a cover on the opposite side. It is advantageous for the cover to be welded to the wall of the hub journal.

However, it is also possible for the internal cross-section of the hub journal to be freely accessible from the outside and/or inside and to be deformed via a mandrel or expanded mechanically via a tool such as a tool with expanding jaws.

If particularly high forces are to be transmitted, it may be advantageous for the shaft, in the region of the hub journal, to be provided with a radial winding. The fibers of the laminate included in the fiber composite material are subjected to tensile loads only, which is the reason why it is possible, via additional radial winding, to achieve the high tensile stress required for high torque transmission values, even when carrying out a radial expansion operation.

In a further embodiment, the shaft, in the region of the hub journal, may be encircled by an external steel ring. This provides, especially in the case of thin-walled tubes, that the required elastic compression relative to the plastically expanded hub journal is increased. Prior to expanding the hub journal, the steel ring may be pressed or shrunk on the shaft or it may be slid on in a substantially friction-free manner. To enable the steel ring to participate in the transmission of torque while substantially increasing the friction bearing surface, it may be non-rotatingly secured relative to the hub journal, such as by welding the ring to the tube end of the connecting element.

In a second embodiment in accordance with the invention, an externally positioned steel ring, in the form of a tensioning ring radially reduced on the shaft end, i.e. plastically compressed in situ, is positioned on the shaft end under radial compression. The elastically deformed shaft end is supported on the inside by either the substantially undeformed or the elastically deformed hub journal. As in the first embodiment, to ensure that the steel ring does not only effect clamping compression but also participates in the transmission of torque, the steel ring may be non-rotatingly secured to the connecting element. The securement of the ring to the connecting element at the same time increases the effective friction surface relative to the shaft end. The steel ring may be secured by form-fittingly being pressed into circumferential teeth or knurling at the surface of the connecting element Alternatively the connection can be accomplished by welding the ring to the tube end of the connecting element A third embodiment in accordance with the invention has the hub journal take the form of a tensioning ring plastically and radially reduced on the shaft end. The internal diameter of the hub journal encircles the end of the shaft. The hub journal is then radially compressed inward resulting in a clamping arrangement relationship with the shaft outer diameter. This embodiment is analogous to the previous one to the extent the force flows primarily via the hub journal into the connecting element such as the case with the steel ring of the prior embodiment if it is non-rotatingly secured to the connecting element. To complement the externally positioned hub journal and to build up a radial pressure on both sides of the shaft a supporting ring may be inserted within the shaft which, either before or after the hub journal has been reduced, may be welded to the connecting element. The welding may be done from the outside by welding through the connecting element using laser technology.

The transmission of torque may be improved further by providing the surface of the outer face of the hub journal of the first and second embodiments and the inner face of the hub journal of the third embodiment with a textured surface produced by knurling, sandblasting, etching, scrubbing or similar operations. The coefficient of friction of the journal surface relative to the surface of a fiber composite material is increased by the texturing.

Prior to being joined, unevenness in the resin layer of the shaft resulting from the production process should be removed The surfaces of the tubular shaft member participating in the friction locking effect should be turned or machined in order to eliminate any such unevenness.

Furthermore, it is an object of the invention to provide an improved method of producing a locking connection between a tubular shaft made of a fiber composite material and a metallic connecting element having an internally or externally positioned hub journal in the form of a hollow journal, which method permits a high radial compression while avoiding disadvantageous mechanical or thermal effects acting on the shaft.

An objective may be achieved by providing a hub journal with an outer diameter which relative to the inner diameter of the shaft is such that the hub journal is introduced into its axially seated position in the shaft in a substantially friction-free way. The inserted wall of the hub journal is then plastically deformed radially outward by a radially acting force, with the outer surface of the hub journal being made to establish a locking connection with the inner face of the shaft.

In a first preferred embodiment of the method, an enclosed chamber in the hub journal is completely filled with a pressure medium and pressurized. For this purpose, a coaxial supply bore may be provided in the connecting element which is freely accessible from the outside. If desirable, it is possible, additionally, to provide a ventilation bore to speed up the process of filling and emptying the chamber.

In a second embodiment of the method, while ensuring free accessibility to the hub journal at least from the tube interior (in which case it is possible to produce only one such connection at the tube) or, depending on the design of the connecting element, from the outer ends as well (in which case two elements of this type may be used at one tube), a pressure agent mandrel may be inserted, with the hub journal being pressurized with the pressure agent in an annular space positioned between seals.

For a third embodiment of the method, it is possible, instead of the previously mentioned pressure agent mandrel, to introduce a mechanical expanding tool which may be a simple mandrel. Alternate means for mechanically expanding the hub journal include the use of expanding jaws or circumferentially distributed expanding rollers which are over sized relative to the undeformed tube interior and are pulled through the journal.

In a further embodiment of the above-mentioned method, the hub journal has an outer diameter which permits substantially friction-free insertion into the tube end of the shaft prior to forming the connection. An outer steel ring with an inner diameter which permits substantially friction free sliding on to the tube end is also slid over the shaft. The hub journal is inserted into the tube end of the shaft which in turn has had the steel ring slid over its outer diameter. The steel ring is radially and plastically reduced in diameter with the inner face of the steel ring and the outer surface of the hub journal establishing a locking connection with the elastically reduced shaft. The hub journal is subjected to radial loads in the elastic range only to maintain the locking connection Another embodiment for producing the connection comprises providing a hub journal with an inner diameter which permits substantially friction-free sliding on to the shaft. The hub journal is inserted onto the shaft end so as to concentrically encircle it. An internally positioned supporting ring sized for friction free sliding may be inserted into the inner diameter of the shaft. The hub journal is radially plastically reduced, with the inner face of the hub journal and the outer surface of the supporting ring (if used) establishing a force-locking connection with the elastically reduced diameter of the shaft end. Again, prior to reduction of the diameters, the shaft end is slid into the hub journal in a way which is free from shearing forces along the surface which may cause damage. While the hub journal is reduced in diameter to its plastic range, the shaft end and the inserted supporting ring (if used), are radially deformed in the elastic range to maintain a bias force against the plastically deformed hub journal.

All embodiments for the said production methods have the common feature that, due to the differences in diameter, while the parts are inserted into each other there is no damage that occurs at the tube end of the shaft, especially at the tube surfaces, and that nevertheless, a firm radial compression is ensured between the hub journal and shaft end (and possibly also with the externally or internally positioned steel ring, if used).

In contrast to joining operations carried out by thermal shrinking, the fiber composite tube is not subjected to disadvantageous influences of temperature. The substantially friction-locking connections have the advantage that, in the case of overloading due to excess torque, the hub journal can rotate relative to the shaft in a non-destructive way. This allows subsequent operation in a relatively locked relationship where the maximum torque the connection is capable of transferring has been reduced only slightly. This means that such connections may serve as overload couplings where they are designed for the maximum torque required.

From the following detailed description taken in conjunction with the accompanying drawings and subjoined claims, other objects and advantages of the present invention will become apparent to those skilled in the art.

DETAILED DESCRIPTION OF THE DRAWINGS

FIG. 1 is a cross sectional view of a first embodiment of the shaft connection of the present invention.

FIG. 2 is a cross sectional view of an embodiment of a shaft connection according to the present invention.

FIG. 3 is a cross sectional view of a shaft connection according to the present invention.

FIG. 4 is a cross sectional view of an embodiment of a shaft connection according to the present embodiment.

FIG. 5 is a cross sectional view of an embodiment of a shaft connection according to the present invention.

FIG. 6 is a cross sectional view of an embodiment of a shaft connection according to the present invention.

FIG. 7 is cross sectional view of an embodiment of a shaft connection according to the present invention.

FIG. 8 is a cross sectional view of an embodiment of a shaft connection according to the present invention.

DETAILED DESCRIPTION OF THE PREFERRED EMBODIMENTS

As illustrated in FIG. 1, a shaft 11, for example, a shaft made of a fiber composite material, is to be connected to a connecting element 10. The connecting element 10 comprises a hollow hub journal 12 inserted into the shaft 11 and an externally positioned plug-in journal 17 provided with splines 18. The hub journal 12 is provided with a chamber 13 which is formed at one end by a welded-on cover 14.

Opposite the cover 14, the plug-in journal 17 is provided with a concentric, axially extending bore 16. Through the bore 16, the chamber 13 may be filled with and pressurized by a pressure medium indicated by an arrow. The pressure medium may be hydraulic oil or water.

For producing the connection the outer diameter of the hub journal 12 should initially not be greater than the inner diameter of the shaft so as to permit the parts to be inserted into each other free of axial forces, especially those which may tend to shear surface material. Upon application of hydraulic pressure, the wall 15 of the hub journal 12 is expanded, with the outer diameter remaining increased beyond the original inner diameter of the shaft. As a result, the outer surface 21 of the wall 15 of the hub journal 12 is connected to the inner face 19 of the tube 11 in a locking manner. Hence, the hub journal 12 does not require any cost-intensive precision machining and may be manufactured with relatively large tolerances.

To increase the achievable elastic compressive force, the shaft 11, in the region of the hub journal 12, is provided with additional radial winding 22. The additional radial winding 22 appears as the thickened portion of the shaft 11.

After the wall 15 has been expanded, the pressure is relieved and the pressure medium is drained from the chamber 13. As a result of the plastic expansion of the hub journal 12, it is possible to achieve a firm, non-destructive connection between the shaft 11 and the inserted journal 12.

As shown in FIG. 2, a shaft 111, most preferably a shaft made of a fiber composite material is to be connected to a connecting element 110 made of steel. The connecting element 110 comprises a hub journal 112 inserted into the shaft 111 and an externally positioned connecting journal 117 provided with a collar 118. The hub journal 112 is provided with an expanded open end 113.

Opposite the open end 113, the plug-in journal 117 is provided with an expanded, axially extending bore 116. An expanding mandrel 114 whose movement is indicated by an arrow may be inserted into the hub journal 112 through the bore 116.

For producing the connection the outer diameter of the hub journal 112 should initially not be greater than the inner diameter of the shaft 111 to permit the parts to be inserted into each other so as to be free from axial forces. By applying an axial force to the inserted expanded mandrel 114, the latter is further introduced into the bore 116 resulting in the wall 115 of the hub journal 112 being expanded plastically. The outer diameter of the hub journal 112 remains increased beyond the original inner diameter of the shaft. The outer surface 121 of the wall 115 of the hub journal 112 is connected to the inner face 119 of the tube 111 in a locking manner. When sliding in the expanding mandrel 114, the hub journal 112, with the stop or collar 118, is axially supported on the end of the shaft 111. The inner face 119 may be pre-manufactured with relatively large tolerances. To increase the achievable elastic compressive force, the shaft 111, in the region of the hub journal 112, is provided with a radial winding 122. The additional radial winding 122 appears as the thickened portion of the shaft 111.

FIG. 3 shows a connecting element 210 which is connected to the shaft 211. The connecting element comprises a hub journal 212 which, at the shaft end, comprises an open end 213 flaring out conically. At the outer opposite end, the collar region 218 and the hollow connecting journal 217 are illustrated. A steel ring 222 is slid on to the shaft 211 and extends as far as the collar region 218. The connecting element 210 in said collar region has an increased inner bore 216. An expanding mandrel 214 with a spherical head is smaller than this bore 216, but is oversized relative to the inner diameter of the undeformed wall 215 of the hub journal 212. Sliding the mandrel through in the direction of the arrow (and possibly withdrawing it) leads to a plastic deformation of the wall 215 thereby achieving a friction-locking fit between the expanded inner face 219 of the shaft end 211 and the outer surface 221 of the hub journal 212. The outer surface 223 of the tube or shaft end 211 is radially deformed in the elastic range and is supported on the inner face 224 of the steel ring 222.

FIG. 4 shows a connecting element 310 and a shaft end 311 whose connection substantially comprises that shown in FIG. 3. In FIG. 4 areas corresponding to FIG. 3 have been given like reference numerals increased by 100 to the 300 range. In FIG. 4, a steel ring 322 is extended beyond the tube end as far as the region of the journal 318 and connected to the tube end by a weld 325, thereby enabling the ring 322 to transmit a portion of the torque due to the friction-locking connection between the outer surface 323 of the shaft end and the inner face 324 of the steel ring. Alternately to expanding the diameter of the hub journal 312, the diameter of the steel ring 322 can be plastically radially upset inwardly such as by use of a drawing tool or die. Another method for expanding the hub journal may be carried out as follows. At least one sealing element is located within the hub journal. A fluid is introduced into the hub journal. A pressure mandrel is also introduced into the hub journal. The pressure mandrel includes two sealing elements whereby an annular chamber is created containing the fluid. The fluid is then pressurized to plastically deform the hub journal.

FIG. 5 shows the production of a connection between the shaft 411 and a connecting element 410 which comprises a hollow hub journal 412 inserted into the shaft 411 and an externally positioned plug-in journal 417 provided with splines 420. The journal is provided with a bore 416. When the hub journal 412 is designed as illustrated in FIG. 1, it may serve to supply a hydraulic pressure agent. However, in the present case the shaft 411 is slid on to the hub journal 412 and a steel ring 422 is slid on to the shaft. Subsequently, as indicated by the arrows, the steel ring 422 is plastically deformed in the radially inward direction, thereby achieving a friction-locking connection between the inner face 419 of the tube end and the outer surface 421 of the hub journal 412. Before or after the deforming operation, the steel ring 422 and connecting element 410, in the region of a step 418, may be secured such as by a weld 425.

FIG. 6 shows a shaft 511 and a connecting element 510 which substantially correspond to those of FIG. 5. Corresponding areas have been given reference numerals increased by 100 over those shown in FIG. 5. In FIG. 6, the connecting element 510 of this embodiment is provided with a raised surface such as circumferential teeth or knurling 526. The steel ring 522 is form-fittingly pressed therein while being reduced radially and thereby effects a connection. Any shape of teeth or knurling is suitable and leads to the required transmission of force, across the steel ring 522 into the connecting element 510.

FIG. 7 shows the production of a connection between a shaft 611 and a connecting element 610. The connecting element 610 comprises a hollow hub journal 612 slid on to the shaft 611 and an adjoining plug-in journal 617 provided with splines 620. The journal is provided with a bore 616. As indicated by the arrows, the hub journal 612 is plastically deformed radially inward after having been slid on to the shaft end 611 so that there occurs a friction locking connection between the inner face 623 of the hub journal 612 and the elastically reduced outer surface 624 of the shaft end.

FIG. 8 shows similar details as FIG. 7, with corresponding areas having been given reference numerals increased by 100. A supporting ring 727 is inserted into the shaft end 711 and reduces the radial reduction of the shaft end 711 while the externally positioned hub journal is plastically deformed in the radial direction, thereby causing a greater radial compression force between the hub journal 712 and the shaft end 711. The supporting ring 727 may also be further axially inserted into the connecting element 710 than indicated in FIG. 8 so that when radially welded to the connecting element an additional path for torque transmission purposes is produced between the supporting ring 727 and connecting element 710.

Any details in the figures which have not been referred to individually correspond to those of figures with the same two end digits.

While the above detailed description describes the preferred embodiment of the present invention, the invention is susceptible to modification, variation, and alteration without deviating from the scope and fair meaning of the subjoined claims.

We claim:

1. A locking connection for transmitting torque comprising:
   a fiber composite hollow tubular shaft being capable of elastic radial expansion;
   a metallic connecting element having a hub journal plastically expanded within said tubular shaft elastically expanding said tubular shaft; and
   said hub journal having a plastically expandable chamber means, capable of being pressurized for expanding said hub journal within said tubular shaft, said hub journal being in a compressive connecting relationship to said elastically expanded tubular shaft such that said shaft and said connecting element maintain a locked connection.

2. The connection of claim 1 wherein said chamber means comprises a connecting element end and a shaft end and said shaft end is enclosed by an inserted cover.

3. The connection of claim 2 wherein said inserted cover is welded to said hub journal.

4. The connection of claim 1 further comprising an internal bore disposed within said connecting element operably connected to said chamber means wherein pressurization of said chamber means via said bore expands said chamber means.

5. The connection of claim 1 further comprising radial windings of said shaft wherein said radial windings elastically bear against said plastically expanded hub journal.

6. The connection of claim 1 further comprising a steel ring externally concentric and in compressing relationship to said shaft in the region of the hub journal.

7. A locking connection for transmitting torque in a driveshaft comprising:
   a fiber composite torque transmitting tubular shaft;
   a metallic connecting element having two ends;
   said connecting element further comprises a raised surface;
   a hub journal secured to one end of said connecting element, said hub journal disposed within said tubular shaft; and
   a steel ring plastically radially reduced over the external diameter of said tubular shaft so as to elastically clamp said tubular shaft into compressive connection to said hub journal said steel ring is secured to said connecting element in a non-rotating manner relative to the hub journal by form-fitting said steel ring to said raised surface.

8. A method of producing a locking connection for transmitting torque comprising:
   providing a tubular shaft;
   sizing a hub journal with an outer diameter not greater than the inner diameter of said shaft and said hub journal including a plastically expandable chamber means capable of being pressurized for expanding the hub journal;
   placing said hub journal within said shaft; and
   deforming a portion of said hub journal chamber plastically radially outward into contact with said shaft, said shaft exerting an elastic compressive force against said hub journal maintains said shaft and said hub journal in a relatively locked connection.

9. The method of claim 8 wherein said plastically deforming further comprises hydraulically deforming.

10. The method of claim 9 wherein said plastically deforming comprises filling the complete chamber inside the hub journal with pressurized medium.

11. The method of claim 9 further comprising:
   locating at least one sealing element within said hub journal;
   introducing a fluid into said hub journal;
   introducing a pressure mandrel within said hub journal comprising two sealing elements whereby an annular chamber is created containing said fluid; and pressurizing said fluid to plastically deform said hub journal.

12. The method of claim 8 wherein said plastically deforming comprises displacing a mechanical mandrel axially inside said hub journal.

13. The method of claim 8 wherein said plastically deforming further comprises use of a tool with expanding jaws.

14. The method of claim 8 further comprising introducing a tool with expanding rollers through said hub journal to produce said plastic deformation.

15. The product formed by the process of claim 8.

16. A locking connection for transmitting torque comprising:
 a fiber composite hollow tubular shaft capable of elastic radial expansion;
 a metallic connecting element having at one end a hub journal plastically expanded within said tubular shaft so as to elastically expand said tubular shaft, said hub journal further including an internal cross section freely mechanically accessible from the shaft end or from the connecting element end;
 a steel ring externally concentric and in compressing relationship to said shaft in the region of the hub journal;
wherein said steel ring is welded to said connecting element.

17. A locking connecting for transmitting torque in a driveshaft comprising:
 a fiber composite torque transmitting tubular shaft;
 a metallic connecting element having two ends;
 a hub journal secured to one end of said connecting element, said hub journal disposed within said tubular shaft; and
 a steel ring plastically radially reduced over the external diameter of said tubular shaft so as to elastically clamp said tubular shaft into compressive connection to said hub journal and said steel ring is welded to the connecting element.

18. A method of producing a locking connection for transmitting torque comprising:
 providing a tubular shaft;
 sizing a hub journal having a plastically expandable chamber and including an outer diameter less than the inner diameter of said shaft;
 placing said hub journal within said shaft;
 deforming said hub journal radially outwardly into contact with said shaft by filling the complete chamber inside the hub journal with a pressurized medium, said shaft exerting an elastic compressive force against said hub journal; and
 draining said pressurized medium from said chamber such that said compressive force is maintained on said hub journal by said shaft such that said hub journal and said shaft are locked together.

* * * * *